United States Patent [19]

Gainer et al.

[11] 4,099,805

[45] Jul. 11, 1978

[54] EXTRUDABLE LUBRICANT WICKING MATERIAL

[75] Inventors: Gordon C. Gainer, Penn Hills; Russell M. Luck, Monroeville, both of Pa.

[73] Assignee: Westinghouse Electric Corp., Pittsburgh, Pa.

[21] Appl. No.: 806,970

[22] Filed: Jun. 16, 1977

[51] Int. Cl.$^2$ ............................ F16C 1/24; F16C 3/14; C10M 5/00; C10M 7/00

[52] U.S. Cl. ..................................... 308/240; 252/14; 308/243

[58] Field of Search ................... 252/14; 308/240, 243

[56] References Cited

U.S. PATENT DOCUMENTS

| | | | |
|---|---|---|---|
| 1,827,737 | 10/1931 | Coolidge | 252/14 |
| 1,918,187 | 7/1933 | Kirner | 252/14 |
| 2,282,466 | 5/1942 | Etzkorn | 252/14 |
| 2,966,459 | 12/1960 | Abel | 252/14 |
| 3,214,375 | 10/1965 | Berkeley | 252/14 |
| 3,466,244 | 9/1969 | Abel | 252/14 |

*Primary Examiner*—Delbert E. Gantz
*Assistant Examiner*—Irving Vaughn
*Attorney, Agent, or Firm*—D. P. Cillo

[57] ABSTRACT

An extrudable, oil-permeated wicking material, for use in lubricating sleeve metal bearings, is made from a mass of steam-pressure-splayed, swollen, lignin-containing, dried, wood fibers, and a contained lubricating oil; where the weight ratio of oil:lignin containing wood fibers is from about 8:1 to about 3:1, and the oil is contained in microcapillary voids in contact with the lignin.

10 Claims, 6 Drawing Figures

EXTRUDABLE LUBRICANT WICKING MATERIAL

BACKGROUND OF THE INVENTION

Oil-impregnated, fibrous, cellulose wicking materials, which can be injected under pressure into bearing reservoirs, without separation of the lubricating oil and the fibrous wicking material, are well known in the art. Abel, in U.S. Pat. No. 2,966,459, taught injectable, oil-impregnated, chemically pulped, fibrous, cellulose wicking materials, consisting of pulverized cellulose fibers and a mixture of paper-containing fibers of wood and cotton. These cellulose fibers are used in varying amounts. They can be injected into bearing cavities and used in fractional horsepower motor bearings and other sleeve bearings.

Berkeley, in U.S. Pat. No. 3,214,375, taught injectable, oil retaining, fibrous wicking materials, consisting of cellulose fibers, completely film coated with an oil resistant polyamide polymer, which could be mixed with nylon or graphite fibers, to provide faster oil release to bearing surfaces.

These materials, however, when used in highly loaded bearings operating at elevated temperatures, tend not to release the oil fast enough to insure complete, protective lubrication. Abel, in U.S. Pat. No. 3,466,244, attempted to provide faster oil release materials, by using all cotton linter fibers, as the injectable, oil-impregnated wicking material.

Even though advances have been made, problems still remain in lubricating highly loaded bearings operating at elevated temperatures, in that wicking materials are needed which will provide even faster flow rates than those taught in the art. The ideal wicking material for fractional horsepower motor bearings should exhibit the highest possible flow rate, at any given oil content, and even more importantly, it should deliver the maximum amount of oil to the bearing surface i.e. at least about 40 weight percent before oil flow essentially stops. The best prior art wicking materials deliver only about 30 weight percent of the contained oil.

Obviously, a highly absorbant wicking material, which tenaciously holds onto the oil absorbed therein, and which will not function to deliver most of its contained oil, is of little merit in the important function of supplying lubricant to a bearing.

What is needed is a new and improved wicking material that will provide a more liberal quantity of oil to the surface to be lubricated than the prior art materials, and which will continue to supply the oil for a longer time period, as shown by the increased amount of total oil released.

SUMMARY OF THE INVENTION

The above needs are met and the above problems solved by providing a steam-pressure-splayed extrudable, oil-permeated, lignin-containing body of swollen, dried wood fiber wicking material. The fiber of the wicking material is specially steam-pressure-splayed, to provide a swollen mass of micro-splayed, dried wood fibers, containing microcapillary voids retaining substantially all of the lignin present initially in the natural wood chips. The fibers are cut so as to be capable of passing through a 0.095 inch diameter screen opening. The fiber comprises at least 90 weight percent of such natural lignin-containing wood fibers.

The steam-pressure-mechanical treatment, which can be thermomechanical refining (TMR), softens the lignin in the wood at a high temperature in the presence of steam, and swells the wood fiber chips. The chips are then mechanically sheared, while hot, which microsplits the swollen, softened fibers, and provides, when dried, microcapillary voids within the lignin-containing fiber structure. The resulting material, unlike chemically pulped wood, retains substantially all of the natural lignin content of the wood chip starting material.

The lignin, in the dried, steam-pressure-splayed wood fibers, contacts the contained oil and tends to prevent complete oil impregnation into the cellulose fiber component of the wood. Thus, oil flows freely through the interstices caused by pressure-steaming and microsplaying, and is retained within the cellulose fiber component to a much lesser degree than in a 100 percent cellulose, chemically pulped wood or cotton linter based material.

The thermomechanically refined (TMR) wicking fibers do not require film coating with oil resistant polymers as taught in U.S. Pat. No. 3,214,375. The wicking materials of this invention provide at least double the oil flow rates of cotton linter or chemically pulped cellulose fibers, and deliver about 45 to 50 weight percent of the contained oil before oil flow essentially stops. The thermomechanically processed fibers are also from 2 to 4 times less expensive than chemically proessed pulp fibers and cotton linter fibers respectively.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
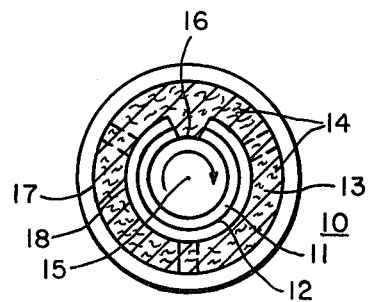
FIG. 1 is a cross-sectional view of one type of a bearing and sleeve containing the wicking material of this invention, after assembly of the sleeve within the bearing body.

Referring to FIG. 1 of the drawings, one type of metal bearing end bell body 10 is shown, with a pressfitted, non-rotating, metal bearing sleeve 11 inserted therein. The bearing sleeve outside surface is in contact relationship with the bearing body, non-rotating inside surface at point 12. The bearing body contains an annular interior reservoir recess 13 containing lubricating wicking material 14. This wicking material is an oil-permeated, fine, steam-pressure-splayed fiber mass, which is extrudible, and which can therefore be injected by suitable means into the reservoir recess 13. The rotating shaft is shown as 15.

During operational rotation of motor shaft 15, oil from the wicking material in the reservoir will lubricate the contacting bearing sleeve surfaces by capillary action. A piece of wool-based felt can be optionally inserted at the reservoir window 16, to better contain the fine fibers of the wicking material, which are in contact with the felt. The reservoir window 16 allows the oil to contact the shaft 15 either through the felt or by direct contact with the wicking material. Shown as dotted lines are support ribs between the annular surfaces of the bearing body shown as 17 and 18.

In factory production, prior to motor shaft insertion, the oil-permeated wicking materials are pressure injected, in metered amounts, into the reservoir recess in the bearing end bell body. In general, a auger screw, several inches in diameter, propels the wicking material from a large agitated vessel into an injection cylinder. On demand, a piston-type plunger, operated at about 90 psi. air pressure, closes on the injection cylinder and thereby discharges a metered amount of the wicking material through a suitable orifice or ducts, about ⅛ inch minimum diameter to the reservoir cavity in the end bell bearing body. This technique is well known in the art and is more completely described in U.S. Pat. No. 2,966,459.

The fibers which comprise the wicking materials of this invention consist of dried, steam-pressure-splayed wood, preferably at least 75 weight percent poplar wood fibers selected from the group consisting of largetooth poplar, aspen poplar, balsam poplar, cottonwood poplar, mixtures thereof, and other equivalent poplar types, with aspen poplar and largetooth poplar being most preferred. Other woods, such as gum, elm, ash, maple, birch, spruce, fir, pine ad hemlock, when steam-pressure-splayed, can also be used alone or mixed with the preferred poplar woods.

The preferred poplar woods are typified by aspen (populus tremuloides). This is found from southern Labrador to Hudson Bay and northwestward to the Mackenzie River and Alaska; southward to Pennsylvania, northeastern Missouri, southern Nebraska and throughout the western mountains to northern New Mexico and Arizona and central California. It has a specific gravity of about 0.35 to 0.38, a side hardness of about 300 to 346 (weight in pounds to embed a 0.4 inch steel sphere to half its diameter in green wood), and a lignin content of about 23.5% for complete logs. These preferred poplar woods are relatively light, soft, porous and inexpensive.

In wood, the fibers are not separate, but are bound together by non-cellulosic material. This material is lignin, meant to also include small amounts of some polymeric non-cellulosic carbohydrates and wood sugars which may also be present. The lignin confers rigidity and strength, and acts as a natural binding and cementing material for the natural wood cellulose structure of the tree.

Figure 2A:
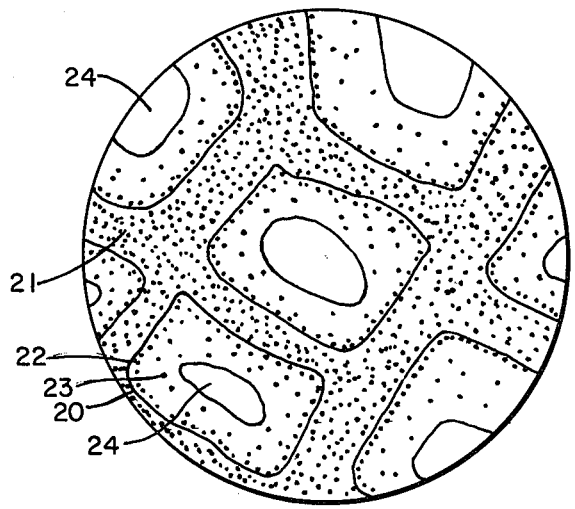
FIG. 2 shows an idealized microscopic view of wood cross-sections; showing in 2(A) the initial wood structure, in 2(B) the wood structure after chemical pulping, and in 2(C) the wood structure after steam and heat thermomechanical processing.

FIG. 2(A) shows an idealized, simplified crosssectional microscopic view of wood fibers 20 with cementing lignin 21, shown as dots, essentially, completely therebetween. In contact with the cementing lignin 21 is the primary fiber wall 22. Inside this primary wall is a bulky secondary wall 23 containing chiefly cellulose with some lignin near the primary wall surface. The central cellulose portion of the fiber is shown as 24. This comprises holocellulose, consisting of true cellulose and hemicelluloses. About 70% to 90% of the lignin contained in the wood will be concentrated between the wood fibers, with the remaining lignin contained throughout the secondary cell wall 23.

Lignin is an exceedingly complex, three-dimensional branched-chain amorphous polymer, built up of phenyl propane-type units whose structure is not yet completely defined. In mechanical pulping, the lignin is not removed. Barked logs are sent into a grinder where a hydraulic ram presses the logs firmly against a rotating grinder, in the presence of a stream of water, to scrub fiber from the logs. After grinding, the pulp is washed and screened to provide very fine, very short fibers. The resultant pulp, known as ground wood pulp, is relatively low in strength, and due to high non-cellulose content has poor resistance to light and aging. It is used frequently for newsprint.

In chemical pulp refining, chemicals are used to chemically dissolve and remove most of the cementing lignin and wood sugars, to produce long cellulose fibers. The active chemical pulping ingredient is most commonly a sulfite or sulfate of sodium, although alkalies such as NaOH, Ca(OH)$_2$ or Mg(OH)$_2$ are employed in some processes. Here, debarked logs are chipped and screened. The chips are then cooked in the chemical liquor under high-pressure steam. The chemical liquors first remove the intercellular lignin rapidly and then attack the cell wall lignin, reducing lignin content to about 7 weight percent or less. Continued cooking removes further lignin in the secondary wall to produce substantially pure cellulose fibers, sometimes known as alpha cellulose.

Figure 2B:
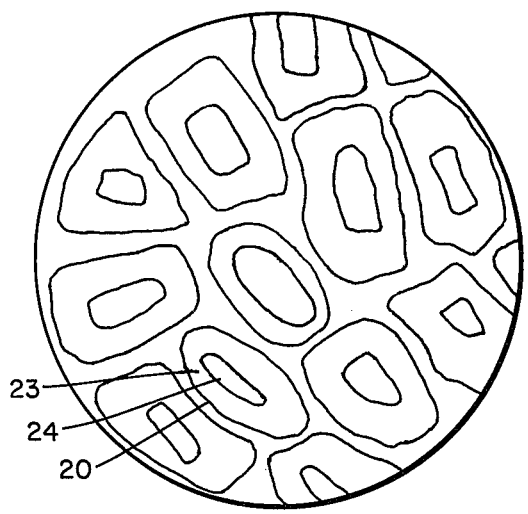

The result of the chemical pulping process is shown in idealized, simplified FIG. 2(B), where the attacked secondary wall 23 is shown surrounding the central cellulose portion 24 of the fiber. Virtually no lignin remains between or within the wood fibers 20. Oil can then easily permeate between the fibers and impregnate them to a very substantial degree. The oil impregnated into the fibers will be held tenaciously by them, and is not easily released during lubrication wicking operations.

Figure 2C:
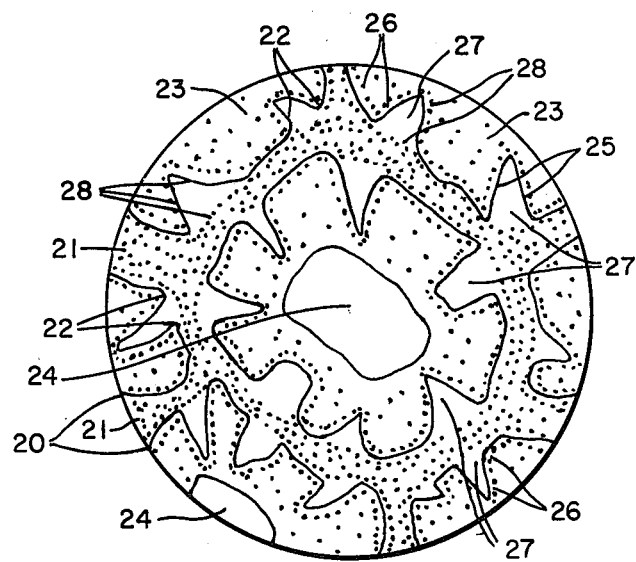

The steam-pressure-splayed wood structure, which may be made by thermomechanical pulping, as used as the wicking material of this invention, is shown in idealized, simplified form in FIG. 2(C). As can be seen, the interfiber cementing lignin 21, shown as dots, remains between the cellulose wood fibers 20. The wood fibers themselves are swollen. The steam-pressure processed, enlarged wood fibers, have split primary walls 22 and split secondary walls at 25. These micro-splayed wood fibers also retain lignin near the primary wall surface at 26, and inside the secondary wall 23. Not shown, the fibers have a fibrillated, ribbon like, interconnected lengthwise structure, which provides good wicking and capillary action. The microsplayed wood contains micro-capillary voids 27 therein, between the wood fibers. These void interstices provide interconnecting microchannels along the length of the mass of wood fibers.

Although applicants do not wish to be held to any particular theory, it is believed that the micro-capillaries are substantially disposed within and surrounded by lignin as shown at points 28. While oil can easily permeate between the fibers through the capillary voids contained throughout the wood fiber structure, the oil is primarily in contact with lignin which is effective as a blocking agent, so the oil cannot easily penetrate the lignin and actually impregnate the cellulose portion 24 of the fiber. Thus, applicants' wicking material provides excellent oil flow coupled with good oil release, due to lignin retention, prior wood fiber swelling and microsplaying, and oil lignin contact.

Thermomechanical refining or pulping (TMR) is well known in the art, and is one method of achieving steampressure-splaying. In general, this process consists in subjecting debarked wood chips to steam under a pressure of about 30 psig. to 55 psig., preferably at temperatures of 130° C to 150° C for a period of time effective to clean and swell the wood. Under these conditions of temperature and pressure, the steam penetrates the wood and softens the lignin which binds the cellulose fibers in the wood chips. The pressure-steamed chips are then passed, still under heat and pressure, between special mechanical double revolving discs in a mill refiner, which intense shearing and attrition of the wood fiber occurs. It is said to thus be fiberized. The revolving disc plates may comprise coarse and fine sections. After being refined in the pressurized double revolving disc refiner, fibers are blown to a cyclone separator where they are separated from the steam and quenched with dilution water. Further reduction or fiberization is accomplished by feeding the cleaned fibers into a second (atmospheric) double disc refining stage, for further fibrillation to a ribbon like structure and fine fiber brooming at the fiber ends.

This process produces cleaner pulps with a high content of good quality long fiber having excellent conformability, excellent bonding properties and greatly improved strength. The thermomechanical refining process provides a fibrillated ribbon like structure, with an absence of chunky debris. End products can include paper "furnish", molding pulp, and various grades of hardboard. In making hardboard, the dried product is treated with small amounts of aqueous dispersions of various binding resins, such as a phenolic resin and catalyst. Then, it is partially dried, felted out on screens, and then pressed to form hardboard containing from about 1 to 4 weight percent binder.

A more complete description of one type of thermomechanical process can be obtained in *Thermomechanical Pulping*, by the C. E. Bauer Process Equipment Group of Combustion Engineering, Inc., Bulletin 1975. Other processes can be used as long as pressure-steamed, enlarged, micro-splayed wood fibers, retaining substantially all of the initial lignin, i.e., at least about 10 weight percent lignin are produced, such as shown in FIG. 2(C). One such other process, wherein wood chips are steamed under pressure and then suddenly depressurized, to splay-explode the chips, to produce expanded, lignin-containing fiber, is commonly known as the Masonite Process. The term steam-pressure-splaying is herein defined to mean all of the above-described or similar processes. If substantially all of the original lignin is not present, i.e., under about 10 weight percent lignin, based on total weight of the treated wood, is present in the wood fiber structure, then the lignin will not block oil flow into the cellulose wood fibers with resulting poor oil release.

The fibers should be capable of passing through a 0.095 inch, 2.4 mm. maximum diameter sieve (screen) opening (U.S. Sieve Size No. 8). If the fibers are longer, they will be difficult to extrude through narrow tubing for injection into the bearing body from reservoir recess. The oil-permeated wicking material of this invention is capable of being injected, by a plunger operating at about 90 psi. air pressure, through a long orifice, which tapers to about ⅛ inch diameter, as would be required in commercial extrusion into a bearing cavity.

If the fibers, after steam-pressure-splaying, are too long, they can be further cut or attrited in any suitable type hammer, impact or other type shearing mill, fitted with appropriate sized screens. The wicking material must comprise between 90 to 100 weight percent lignin bound wood fibers, a small amount of filler or resin will not deleteriously effect oil flow. Over 10 weight percent of nonlignin bound wood fibers can block oil flow through the micro-voids of the treated wicking material.

The steam-pressure-splayed, sheared fibers, when dried, cut and screened, are then homogeneously mixed with a predetermined amount of oil in any suitable mixing means. The weight ratio of oil:lignin-containing, dried cellulose wood fiber is from about 8:1 to about 3:1. If over 8 parts of oil is used per 1 part of fiber, the initial flow rates into the reservoir window to lubricate the bearing sleeve will be too high, with resulting undesirable oil drip from the bearing end bell. If under 3 parts of oil is used per 1 part fiber, the reserve of oil will be insufficient and bearing lubrication will last only a short time. In all cases, oil content within this range will provide a lubricating wicking material that is oily to the touch, easily extrudible, and which will not drip oil into the motor end bell housing.

The oil to be used to imbue the fiber mass can be selected from a wide variety of commercial, premium, heavy duty, hydraulic or automative type crankcase lubricating oils. These oils can contain additives to promote oxidation resistance, anti-corrosion agents, anti-wear agents, pour point depressants, viscosity index improvers and the like. The oil should be thermally and chemically stable at temperatures up to about 145° C, for long periods of time and will generally have a viscosity at 100° F of between about 100 SUS. to about 500 SUS. Oils having viscosities over about 500 SUS. at 100° F will tend to be held in the interconnection voids with resulting poor flow at lower temperatures.

Figure 3:
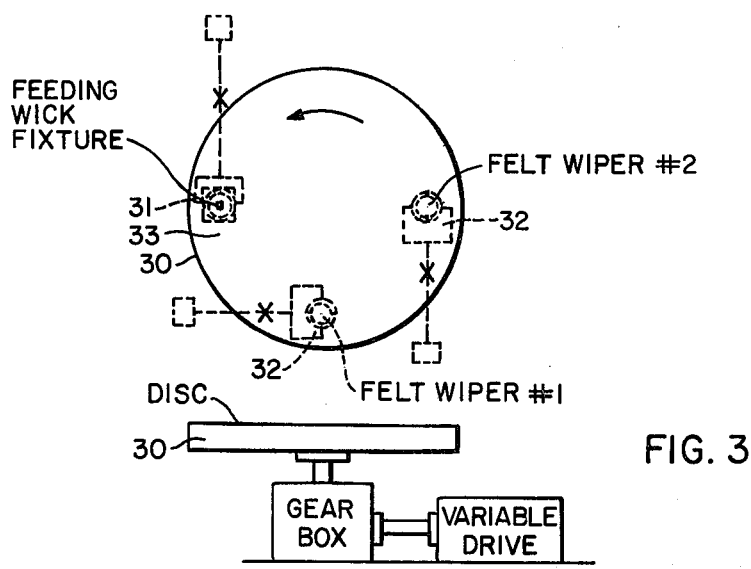
FIG. 3 shows a diagram of the oil flow rate testing apparatus used in the Examples.

The oil-containing wicking materials were tested for oil flow on the apparatus shown in FIG. 3 of the drawings. The testing machine consisted of a 15 inch diameter steel disc 30, rotating at 87 rpm. on which is superimposed a feeding wick fixture 31 and two felt collector wipers 32, all located six inches from the disc center. The feeding wick fixture was a hollow cylinder containing a predetermined weight of fiber and oil in a predetermined volume. The oil used for the test had a viscosity of between about 250 SUS. and 325 SUS. at 100° F.

The wicking material contacts the revolving disc through a reservoir window, with or without a felt feeding wick, and oil flows onto the disc as a band of thin film at point 33 due to capillary action. The felt collector wipers comprise a hollow tube with one end having an initially oilfree, weighed felt wiper contacting the oiled rotating disc. The other end is sealed and under a slight vacuum. After testing, the felt wipers were weighed. The surface velocity was calculated to be identical to the surfce speed encountered on a 0.63 inch diameter shaft of a typical fractional h.p. motor, operating at 1,725 rpm.

In operation, a weighed amount of the oil-containing wicking material, whose flow properties are to be measured, is injected into the reservoir of the feeding wick fixture to a controlled volume. The machine is started and the amount of oil absorbed by the felt wipers is weighed hourly as the test proceeds. Thus, a quantitative determination can be made, under controlled conditions, of the oil fed to the rotating disc in unit time to determine flow rate, and the total amount of oil, which is delivered over a given period of time, under these test conditions. In the wicking material of this invention, using an oil having a viscosity at 100° F of about 250

SUS. to 325 SUS, at near zero oil flow rate, i.e. essentially no more oil flowed onto the revolving plate, about 45 weight percent of the contained oil was discharged in 30 hours, i.e., 55 weight percent of the contained oil remained contained within the fibrous wicking material.

EXAMPLE 1

A wicking material was tested which consisted of dired, thermomechanically pulped wood. This wood fiber consisted of micro-splayed, split, swollen, fibrillated, light, fluffy, tan-colored wood fibers retaining substantially all of its initial lignin content. The fibers were made from feed chips containing about 80 weight percent aspen poplar and largetooth poplar and 20 weight percent mixed hardwood types, mostly birch and maple. The wicking material was dried, 100 weight percent wood based fibers. It had low density and high porosity characteristics. The fibers were thermomechanically steam-pressure-splayed, i.e., thermomechanically pulped, in a Bauer Model 418-36 inch, 2,000 h.p., 1,500 rpm. double disc refiner, operating at about 55 psi., and having a maximum steam pressure of about 150 psig. (gauge). After this thermomechanical pulping, the resulting fiberized wood fibers were dried.

A weighed amount of the dried, thermomechanically treated fibers were further cut and attrited in a six inch laboratory Raymond screen mill operating at about 10,000 rpm. In the mill, the fibers were cut by impact with swinging hammers against the mill housing. The fibers were fed by hand to the mill hopper at such a rate as to maintain a high rate of speed in the mill. The further attrited fibers were blown through a perforated screen in the base of the grinding chamber into a collection vessel containing oil. The screen openings were 0.050 inch diameter. The design of the mill is such as to retain the fibers for further attrition until all the fibers will pass the screen. After thus processing, all of the fibers pass through the opening and into the mixer. Essentially no fraction of the milled fiber was discarded.

The cut, milled and screened micro-splayed fibers were homogeneously mixed with oil in a two gallon mixing vessel, equipped with a paddle-type stirrer which was rotated slowly at approximately 60 rpm. A premium, hydraulic lubricating oil, that was chemically and thermally stable at temperatures of 135° C, and had a viscosity of about 300 SUS. at 100° F was used (sold commercially by Texaco Inc. under the trade name Rando Oil HD 68). The weight rate of oil: lignin-cellulose wood fiber was about 6:1, i.e. 16.7 weight percent fibers. This was further confirmed by solvent extraction tests of a weighed quantity of a given mass of the thus obtained wicking material. After thorough mixing for about one hour the oil-permeated fibers were removed. The fibers were oily to the touch, but did not drip oil.

Figure 4:
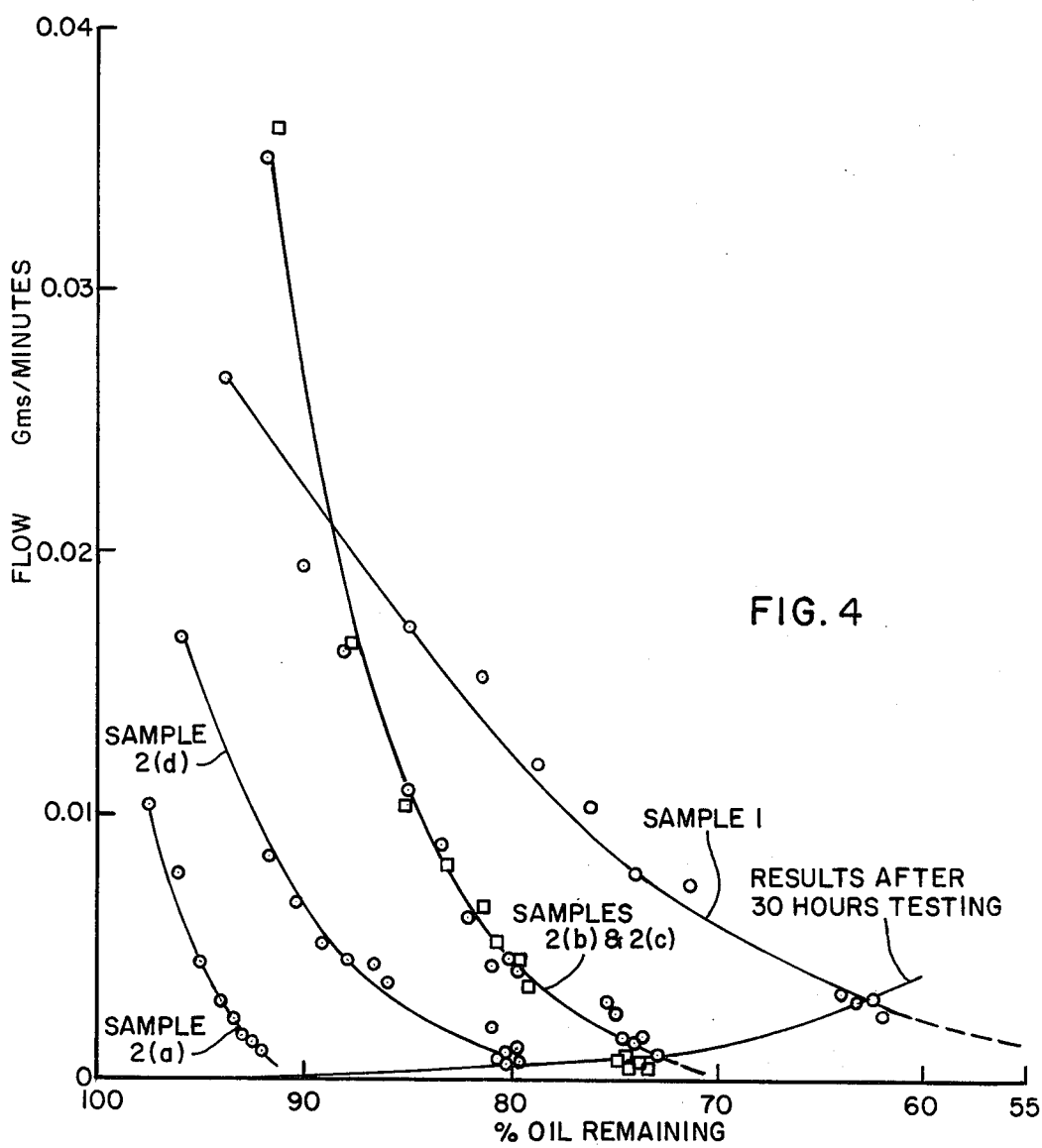
FIG. 4 is a graph showing oil feed, as a function of time, and oil content remaining in the various wicking materials tested.

To test extrudability of this oil-permeated wicking material, an apparatus was devised which consisted of a lever actuated piston plunger 1.75 inches long x 1.5 inches in diameter. This plunger acted in a machined cylinder so as to compress a preweighed quantity of the wicking material. The end of the cylinder was fitted with a removable extrusion head. The material so processed was found to be easily extrudible through an extrusion tip, having a ⅛ inch diameter orifice. Using commercial production plungers, the material was found capable of extrusion, at about 90 psi. air pressure acting on a piston through a long duct, tapered to ⅛ inch diameter, of the type that are used to inject the material into bearing body reservoirs on manufacturing equipment. The oil-permeated wicking materials were then tested for oil flow on the apparatus described hereinabove and illustrated in FIG. 3 of the drawings, at 23° C for 30 hours, using a felt feeder wick in the reservoir window. The results are given in the graph shown as Sample 1, in FIG. 4 of the drawings.

EXAMPLE 2

For comparative purposes, four other wicking materials were tested. Using the same Raymond screen milling technique described above, newspring paperstock that was not steam-pressure-splayed (with partial removal of lignin) Sample 2(a) in FIG. 4; and 100 weight percent cellulose chemically pulped blending stock (purchased from Rayonier Corp. As Rayfluff Q, with total lignin removed), Sample 2(b), both in approximately 0.032 inch thick sheet form, were cut up and sheared in the Raymond hammer mill. They passed through the 0.050 inch diameter screen into a mixer containing Rando HD 68 hydraulic lubricating oil. The weight percent fiber, based on oil plus fiber, was 16 weight percent for the newsprint stock, and 15.8 weight percent for the 100% cellulose chemically pulped paper.

In addition two commerical wicking materials were tested. One sample, identified in FIG. 4 as Sample 2(c), contained 100 wt% cotton linter fibers (not steam-pressure-splayed) was impregnated with premium, refined, hydraulic, lubricating oil having a viscosity of about 250 SUS. to 280 SUS. at 100° F (sold commercially by Permawick Co. under the tradename Permawick HH). It contained 16 weight percent fiber based on oil plus fiber. The other commercial sample, identified in FIG. 4 as Sample 2(d), contained about 65 weight percent very finely ground mechanical wood pulp fibers (not steam-pressure-splayed) and about 35 weight percent sulfite chemically pulped paperstock fibers (with lignin essentially, completely removed), impregnated with premium, refined hydraulic lubricating oil, having viscosity of about 250 SUS. to 280 SUS. at 100° F (sold commercially by Permawick Co. under the tradename Permawick PP). It also contained 16 weight percent fiber, based on oil plus fiber.

Oil flow tests were run using the apparatus shown in FIG. 3. It is readily apparent from the results of the oil flow test, shown as FIG. 4, conducted on a 15 inch diameter disc at 87 rpm, at 23° C for 30 hours, using a felt feeder wick in the reservoir window, that the poplar wood based thermomechanically refined treated wicking material of EXAMPLE 1 (Sample 1) provides a higher flow rate at a given percent depletion that the comparative materials of EXAMPLE 2 (Sample 2(a) = newsprint paperstock not steam-pressure-splayed; Sample 2(b) = 100% cellulose, Rayfluff Q; Sample 2(c) = 100% cotton linters not steam-pressure-splayed, Permawick HH and Sample 2(d) = 35% sulfite paperstock, Permawick PP). Thus, Sample 1 = 0.003 grams/min. with 62% oil remaining after 30 hours; Sample 2(a) = essentially 0 with 90% remaining after 30 hours; Sample 2(b) and Sample 2(c) = essentially 0 grams/min. with 73% oil remaining after 30 hours, and Sample 2(d) = essentially 0 gram/min. with 80% oil remaining after 30 hours.

More importantly, the EXAMPLE 1 (Sample 1) wicking material continues to deliver a much larger percent of the original oil present. Sample 1 shows 45%+ delivery of its contained oil at essentially zero oil flow, whereas the best comparative examples, Samples 2(b) and 2(c) show 30% delivery at essentially zero oil flow, i.e. 70% oil remaining.

Thus, at a given point in time, as the oil in the wicking reservoir is depleted, the improved steam-pressure-splayed, oil-permeated wicking material of EXAMPLE 1, is shown to provide a more liberal quantity of oil to the surface to be lubricated at a given time interval and continues to supply oil in a more liberal manner.

We believe these important properties to be largely due to the presence of the natural lignins which remain in the wood fibers and contact the oil of Sample 1, and which renders the fibers more capable of releasing the oil held in the interstitial micro-capillary spaces or micro-splits along the fiber body throughout the fiber mass. These lignins are totally lacking in the cotton linter product and are also substantially totally removed in the case of 100% chemically pulped cellulose fibers.

The thermomechanically pulped, fiber based wicking materials of EXAMPLE 1, were tested in reservoirs in bearing bodies containing sleeve metal bearings, of fractional horsepower motors and found to provide exceptional, long term lubrication and to be especially useful in high temperature environments. Similar results were obtained with fractional horsepower motors when porous metal sleeve bearings were employed in contact with the wicking materials of EXAMPLE 1.

We claim:

1. An extrudable, oil-permeated wicking material, comprising a lubricating oil, having a viscosity of between about 100 SUS. and 500 SUS. at 100° F, and a mass of steam-pressure-splayed, lignin-containing, celluosic wood fibers, wherein the fibers retain substantially all of the lignin present initially in the wood, the weight ratio of oil:lignin-containing wood fibers is from about 8:1 to about 3:1 and the oil is contained in micro-capillary voids primarily in contact with lignin in the wood fibers so that the lignin in contact with the oil is effective to block oil penetration into the cellulose of the wood.

2. The wicking material of claim 1, comprising at least 90 weight percent of lignin-containing wood fibers, the fibers being capable of passing through a 0.095 inch diameter screen opening and the fibers contain at least 10 weight percent lignin.

3. The wicking material of claim 1, wherein the wood fibers are thermomechanically pulped.

4. The wicking material of claim 1, wherein the mass of wood fibers is fibrillated.

5. The wicking material of claim 1, wherein the oil is a lubricating oil that is thermally and chemically stable at temperatures up to about 145° C.

6. The wicking material of claim 1, being capable of injection through a ⅛ inch diameter orifice at 90 psi. plunger pressure, and having an essentially zero oil flow rate after discharge of about 45 weight percent of its contained oil, where the oil has a viscosity at 100° F of between about 250 SUS. and 325 SUS.

7. The wicking material of claim 1, wherein the wood fibers are at least 75 weight percent poplar wood fibers selected from the group consisting of largetooth poplar, aspen poplar, balsam poplar, cottonwood poplar and mixtures thereof, the steam-pressure-splayed wood fibers contain at least about 10 weight percent lignin, based on total weight of the steam-pressure-splayed fibers, and the lignin substantially surrounds the oil containing micro-capillary voids.

8. A bearing body having a reservoir therein containing the wicking material of claim 1.

9. A method of making an extrudable oil-permeated wicking material comprising the steps of:
  (A) steam-pressure-splaying wood fibers and drying to provide swollen, lignin-containing wood fibers containing micro-capillary voids, wherein the fibers retain substantially all of the lignin initially present in the wood; and then
  (B) cutting the fibers to pass through a 0.095 inch diameter screen opening, and then
  (C) homogeneously mixing the dried wood fibers with a lubricating oil, wherein the weight ratio of oil: lignin containing wood is from about 8:1 to about 3:1, wherein the oil is contained in the micro-capillary voids and primarily in contact with lignin in the wood fibers so that lignin in contact with the oil is effective to block oil penetration into the cellulose of the wood.

10. The method of claim 9 wherein the steam-pressure-splayed wood fibers contain at least about 10 weight percent lignin, based on total weight of the steam-pressure-splayed fibers, and the lignin substantially surrounds the oil containing micro-capillary voids.

* * * * *